United States Patent
Yaeger (10) Patent No.: US 7,882,113 B2
(45) Date of Patent: Feb. 1, 2011

(54) METHOD, APPARATUS, AND SYSTEM FOR FORMATTING TIME DATA TO IMPROVE PROCESSING IN A SORT UTILITY

(75) Inventor: Frank L. Yaeger, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 10/402,705

(22) Filed: Mar. 28, 2003

(65) Prior Publication Data

US 2004/0193578 A1    Sep. 30, 2004

(51) Int. Cl.
G06F 7/00    (2006.01)
G06F 17/30    (2006.01)

(52) U.S. Cl. ...................................... 707/752; 707/725
(58) Field of Classification Search ................. 707/202, 707/8, 201, 7, 101, 102, 3, 725, 752; 717/130
See application file for complete search history.

(56) References Cited

U.S. PATENT DOCUMENTS

| | | | | |
|---|---|---|---|---|
| 4,873,625 | A | * | 10/1989 | Archer et al. ............... 707/752 |
| 5,659,733 | A | * | 8/1997 | Yamashita .................. 707/752 |
| 5,668,991 | A | | 9/1997 | Dunn et al. ................. 395/618 |
| 5,835,915 | A | | 11/1998 | Carr et al. ................... 707/202 |
| 5,852,825 | A | * | 12/1998 | Winslow ............. 707/999.006 |
| 5,873,001 | A | * | 2/1999 | Brinker et al. .............. 712/300 |
| 5,926,816 | A | | 7/1999 | Bauer et al. ..................... 707/8 |
| 5,943,676 | A | | 8/1999 | Boothby ..................... 707/201 |
| 6,055,533 | A | | 4/2000 | Hogge ............................ 707/7 |
| 6,212,529 | B1 | | 4/2001 | Boothby et al. ............. 707/201 |
| 6,223,164 | B1 | | 4/2001 | Seare et al. ..................... 705/2 |
| 6,236,985 | B1 | | 5/2001 | Aggarwal et al. .............. 707/2 |
| 6,324,495 | B1 | | 11/2001 | Steinman ..................... 703/17 |

OTHER PUBLICATIONS

Copyright International Business Machines Corporation, iSeries WebSphere(R) Development Studio,2002. Fifth Edition (Aug. 2002) Version 5, This edition replaces SC09-2508-03, Document No. SC09-2508-04 5722-WDS, pp. 1-36.*

(Continued)

Primary Examiner—Apu M Mofiz
Assistant Examiner—Chelcie Daye
(74) Attorney, Agent, or Firm—Kunzler Needham Massey & Thorpe (57) ABSTRACT

Control statements related to record input, output, filtering, and formatting in a data processing system are scanned by a parser to ascertain a set of specified formats referenced in the control statements. A time generation module receives a time metric provided by a system timer or the like and converts the time metric to a set of time sub-fields ranging from years to seconds. The sub-fields are concatenated to generate a time constant in each specified format. The generated time constants may be inserted into records or used in comparison operations with time-based fields within data records. The present invention increases the utility of a data processing system while minimizing the processing burden associated with formatting time constants.

15 Claims, 8 Drawing Sheets

OTHER PUBLICATIONS

IBM "ILE RPG Reference", Feb. 2001, http://publib.boulder.ibm.com/iseries/v5r1/ic2924/books/c092508302.htm.*

IBM "ILE RPG Reference", Published: Feb. 2001; http://publib.boulder.ibm.com./iseries/v5r1/ic2924/books/c092508302.htm.*

Quiroga, L.M. et al., *Empirical Evaluation of Explicit versus Implicit Acquisition of User Profiles in Information Filtering Systems*, Digital 99 Libraries ACM Conference on Digiatal Libraries, 4th Berkeley, Aug. 11-14, 1999 pp. 238-239.

Ogishi, T. et al., *Design and Implementation of Internet Performance Monitor With Realtime TCP Behavior Analysis*, IEICE Transactions on Communications, vol. E84-B Issue 8, Aug. 2001, pp. 2124-2133.

* cited by examiner (Prior Art)

| yyyy | ddd | mm | dd | hh | mm | ss |
|------|-----|-----|-----|-----|-----|-----|
| '2003' | '074' | '03' | '15' | '13' | '55' | '43' |

| OPERAND | FORMAT | RESULT |
|---------|--------|--------|
| DATE1 | yyyymmdd | '20030315' |
| DATE1( / ) | yyyy/mm/dd | '2003/03/15' |
| DATE2 | yyyymm | '200303' |
| DATE2( - ) | yyyy-mm | '2003-03' |
| DATE3 | yyyyddd | '2003074' |
| DATE3( . ) | yyyy.ddd | '2003.074' |
| TIME1 | hhmmss | '135543' |
| TIME1( - ) | hh-mm-ss | '13-55-43' |
| TIME2 | hhmm | '1355' |
| TIME2( : ) | hh:mm | '13:55' |
| TIME3 | hh | '13' |

530 — OPERAND, 540 — FORMAT, 550 — RESULT

800 → *Stage* Fields = (*Input Field* or *Separator* or *Sequence Number etc.* ...)

810 ⟿ *Stage* - Processing Stage

INREC - Input Record Reformatting

OUTREC - Output Record Reformatting

OUTFIL OUTREC - Supplemental Stage Output Record Reformatting 830 ⟿ *Input Field* - Field from Input Record     *Position, Length* - Field at specified Position and Length
    *Position, Length,* HEX - Hexadecimal representation of Field
    *Position, Length,* TRAN=LTOU - Uppercase representation of Field
    *Position, Length,* TRAN=UTOL - Lowercase representation of Field
    *Position, Length,* TRAN=ALTSEQ - Alternate representation of Field
                                    (using character translation table)

840 ⟿ *Separator* - Separation Field such as blanks, zeros, date, time etc.

| | |
|---|---|
| $nX$ - $n$ EBCDIC blanks | $nC'xx..x'$ - $n$ copies of string '$xx..x$' |
| $nZ$ - $n$ bytes of binary zero | $nX'yy..y'$ - $n$ copies of hex constant '$yy..y$' |
| DATE1 - yyyymmdd | DATE1(c) - yyyycmmcdd |
| DATE2 - yyyymm | DATE2(c) - yyyycmm |
| DATE3 - yyyyddd | DATE3(c) - yyyycddd |
| DATE1P - +yyyymmdd (decimal) | TIME1 - hhmmss |
| DATE2P - +yyyymm (decimal) | TIME2 - hhmm |
| DATE3P - +yyyyddd (decimal) | TIME3 - hh |
| TIME1P - +hhmmss (decimal) | TIME1(c) - hhcmmcss |
| TIME2P - +hhmm (decimal) | TIME2(c) - hhcmm |
| TIME3P - +hh (decimal) | |

850 ⟿ *Sequence Number* - Sequence Number Designator (see DFSORT documentation)

Fig. 8

METHOD, APPARATUS, AND SYSTEM FOR FORMATTING TIME DATA TO IMPROVE PROCESSING IN A SORT UTILITY

BACKGROUND OF THE INVENTION

1. The Field of the Invention

The invention relates to methods, apparatus, and systems for improved data processing. Specifically, the invention relates to methods, apparatus, and systems for formatting and using time constants within a sort utility.

2. The Relevant Art

Record sorting is a necessary and useful utility within data processing systems. Sorting facilitates the ordering of data records in a manner useful for processing applications such as searching data records, generating billing statements, creating reports, compiling directories, and the like. The ability to sort data records using one or more selected fields as a sorting key facilitates intelligent processing of data records.

While sorting is a useful operation, sorting data records and conducting operations associated therewith can consume large amounts of computational capacity, particularly when dealing with files containing a large quantity of data records.

Pipelined sorting systems have been developed to meet the performance demands of applications that process large files. Pipelined sorting systems achieve increased performance by partitioning a problem into stages, where each stage focuses processing resources on specific tasks. Typically, data records in the form of files are fed one record at a time into a processing pipeline. As each pipeline stage finishes processing a data record, the data record may be passed onto a subsequent stage for further processing.

Execution flexibility is one advantage of pipelined processing systems. The processing stages that are ready for execution may be distributed to available processors, while processing stages that are blocked may be suspended to provide processing capacity to other stages.

To increase processing efficiency, control statements associated with a set of data records may be parsed and packed into one or more control blocks prior to actual processing. The control blocks configure the various processing stages of a processing pipeline and facilitate efficient execution. Pipeline stages that are not referenced within control statements are preferably bypassed to eliminate unneeded record handling. The ability to control pipeline stages via control statements essentially provides a job-configurable virtual machine useful to developers and users of pipelined applications and utilities.

In addition to sorting, pipelined sorting systems may include features for selectively processing data records as directed by control statements associated with a set of data records. For example, IBM®'s DFSORT™ utility supports control statements corresponding to a skip stage, a user supplied input stage, a filtering stage, a stop stage, a first reformatting stage, a sort, copy, or merge stage, a second reformatting stage, a user supplied output stage, and one or more supplemental stages.

The skip stage skips or discards a selected number of the data records before passing unskipped records onto the rest of the pipeline. The user supplied input stage facilitates customized processing on the unskipped records or data records provided from programmable sources. The filtering stage filters the data records such that selected records are passed on to the remainder of the pipeline, while other records are discarded or redirected.

The stop stage passes a specified number of the data records to the remainder of the pipeline and thereby limits subsequent processing, such as sorting, to a specified number of data records. The first reformatting stage reformats data records and passes the formatted records to the sort, copy or merge stage. The second reformatting stage may also be used to apply additional formatting operations to the data records subsequent to the sort, copy or merge stage.

The user supplied output stage facilitates execution of customized processing on and data output of the processed data records. The supplemental processing stage may be used to conduct specialized formatting and reporting operations in order to generate multiple forms of output related to a set of data records.

The various stages included in the aforementioned sort utility were developed in response to the needs of developers and users. Each pipeline stage executes in an efficient manner and adds to the flexibility and power of the sort utility. The ability to draw upon the power and efficiency of the utility via control statements severely reduces the programming burden associated with creating customized applications such as generating billing statements, publishing directories, creating reports, and the like.

The data records processed by a sorting utility such as the aforementioned pipelined sort utility may contain a wide variety of data fields. Time-based data fields such as date of sale, expiration date, transaction time, and the like, are frequently generated and are particularly useful for processing. The optimum format of time-based data fields varies widely with usage. The needed resolution may vary from sub-seconds to years. Often, time fields are represented in human readable formats to facilitate human inspection and communication, while processing efficiency can be optimized using binary formats.

The ability to efficiently generate and process time-based data fields increases the utility of data processing systems such as pipelined sort utilities. What is needed are time generation, formatting, and comparison techniques that support a wide variety of formats and are optimized for execution within high performance processing systems and applications such as pipelined sort utilities.

BRIEF SUMMARY OF THE INVENTION

The methods of the present invention have been developed in response to the present state of the art, and in particular, in response to the problems and needs in the art that have not yet been fully solved by currently available data processing methods and apparatus. Accordingly, the present invention provides an improved method, apparatus, and system for generating and using time constants in a plurality of time formats within a data processing system.

In one aspect of the present invention, control statements such as those related to record input, record output, record filtering, and record formatting are scanned to ascertain a set of specified formats referenced in the control statements. A time metric that may be provided by a system timer or the like is retrieved and converted to a set of time sub-fields having formats that in one embodiment range from years to seconds. The sub-fields are concatenated to generate a time constant in each of the specified formats. The generated time constants may be inserted into records or used in comparison operations with time-based record fields.

In another aspect of the present invention, the syntax of various control statements, such as record input control statements, record filtering control statements, record formatting control statements, and record output control statements, is configured to designate a specified time format chosen from a plurality of time formats. The ability to designate a specified time format within various control statements increases the usefulness of data processing systems.

The present invention facilitates increased processing efficiency, particularly when generating multiple time formats simultaneously. For example, conversion of the time metric to the plurality of sub-fields need only occur once, after which the sub-fields may be concatenated together differently for each specified format. Generated time constants may be included within data records or used for comparison with time-based data fields. Comparison of generated time constants with time-based fields within records facilitates selective data processing operations such as selectively inputting, filtering, formatting, and outputting data records.

The various elements of the present invention are combined into a system for processing data records. The system for processing data records includes a mainframe computer configured to execute control statements and a sort utility configured to input, sort, and output a plurality of data records. The system may also include a parser configured to scan the control statements, and a time generation module configured to provide generated time constants in the specified formats. While scanning the control statements, the parser preferably ascertains a set of specified formats referenced in the control statements. The sort utility is preferably further configured to compare referenced time constants within data records with the generated time constants.

The present invention also increases processing efficiency with an improved record formatting method. The improved record formatting method includes the steps of scanning control statements associated with a set of data records, ascertaining a set of specified formats referenced in the control statements, generating a time constant for each specified format, and storing the time constants in locations that are readily accessible. Within a particular set of data records, multiple control statements may select the same specified format. The improved record formatting method eliminates the need to generate a time constant for each record and control statement.

The various aspects of the present invention provide time generation and formatting and comparison methods and apparatus that support a wide variety of formats in an efficient manner. The present invention increases the utility of a data processing system while minimizing the processing burden associated with formatting time constants. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
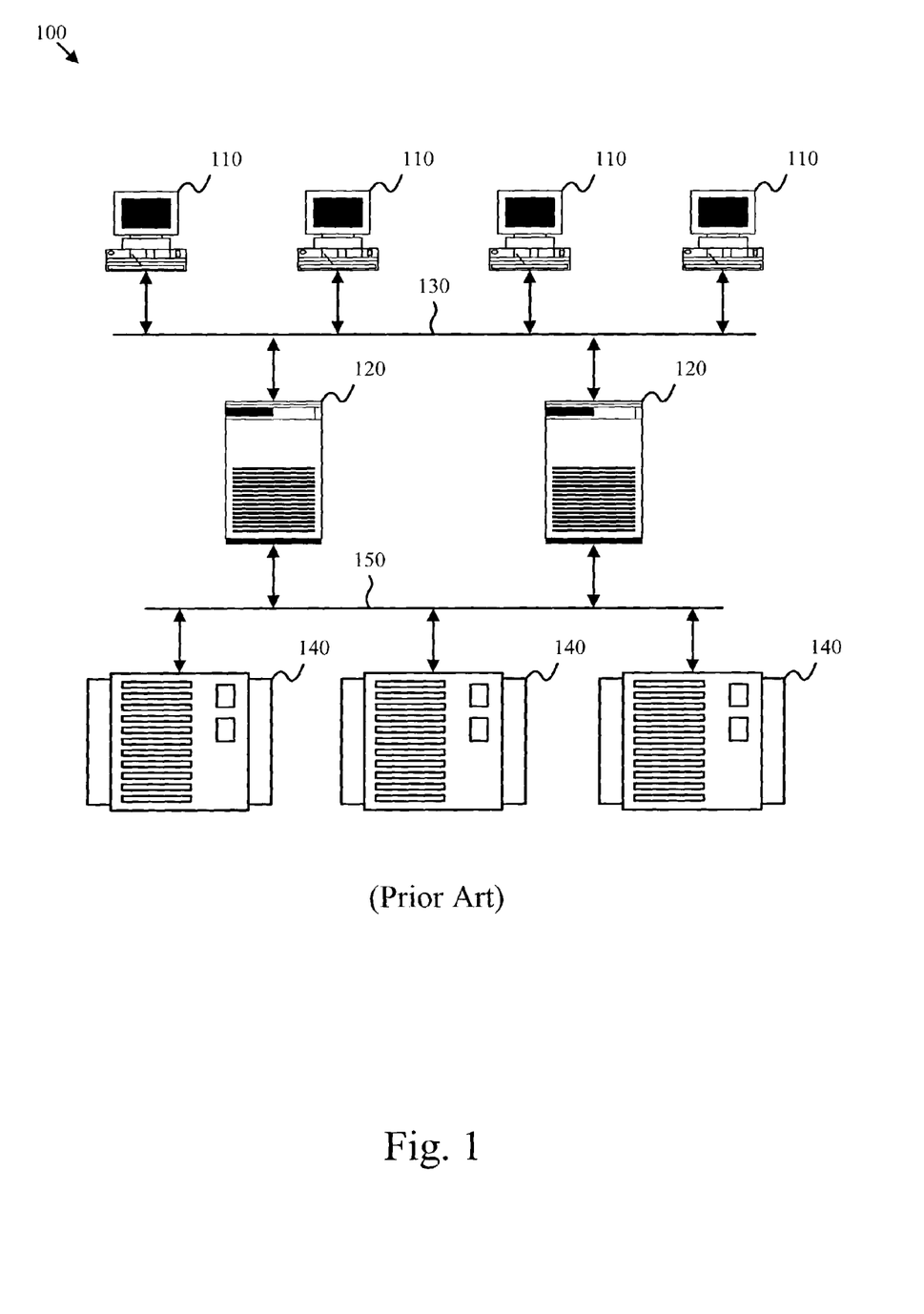
FIG. 1 is a block diagram illustrating a representative data processing system.

Referring to FIG. 1, a data processing system 100 is depicted that is representative of an environment in which the present invention may be deployed. The depicted data processing system 100 includes terminals or workstations 110 interconnected with one or more computers 120 via a network 130. The network 130 may be a local area network and/or a wide area network. Computers 120 may include mainframe computers.

The depicted data processing system 100 also includes one or more storage subsystems 140 interconnected with computers 120 via a storage network 150. The mainframe computers 120 are preferably configured to conduct high bandwidth input and output (I/O) with the storage subsystems 140. The storage subsystems 140 may include redundant components such as storage controllers and storage devices in order to increase reliability.

Figure 2:
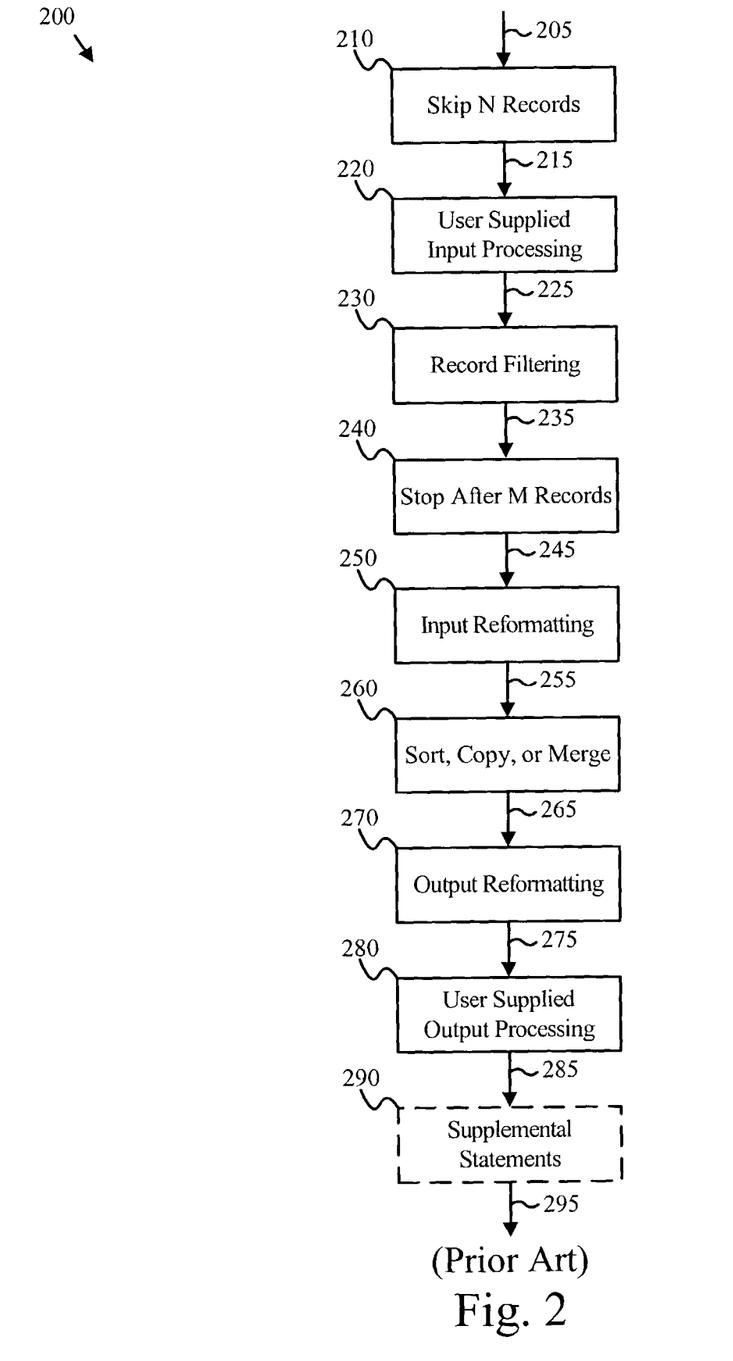
FIG. 2 is a data flow diagram illustrating one embodiment of a data processing pipeline.

FIG. 2 is a data flow diagram of a prior art data pipeline 200 exemplary of the environment wherein the present invention may be deployed. The depicted diagram shows the preferred relationship of various processing stages of the data pipeline

200. The depicted data pipeline 200 of the depicted embodiment is essentially a job-configurable virtual machine that executes on a computer such as the mainframe 120 depicted in FIG. 1.

The data pipeline 200 facilitates efficient record-oriented processing such as copying, filtering, sorting, summing, formatting, and reporting on data records. Although the present invention was developed in response to the needs of the data pipeline 200 on the mainframe 120, the present invention may be deployed separately from the data pipeline 200 and the mainframe 120.

The data pipeline 200 processes data as directed by various control statements corresponding to the processing stages of the data pipeline 200. In one embodiment, multiple control statements corresponding to a set of data records are parsed and packed into one or more control blocks (not shown). The control blocks configure the various processing stages of the data pipeline 200 and facilitate execution of a scheduled job.

Typically, a set of data records 205 in the form of a file is fed one record at a time into the pipeline 200. However, each pipeline stage may process multiple records concurrently, particularly those stages that compare data from multiple records, such as the sort stage 260. Pipeline stages that are not used are preferably bypassed such that records from a previous stage are provided to a subsequent stage without processing by the bypassed stage.

As depicted, the data pipeline 200 includes a skip stage 210, a user supplied input stage 220, a filtering stage 230, a stop stage 240, a reformatting stage 250, a sort stage 260, a reformatting stage 270, a user supplied output stage 280, and one or more supplemental stages 290. Stages 210-250, and 270-290 are optional in that stages that are not referenced by control statements are bypassed within the data pipeline 200. For illustration purposes, the following description generally assumes that each stage is used within the data pipeline 200.

The skip stage 210 skips or discards a selected number of the data records 205 before passing unskipped records 215 onto the next stage of the data pipeline 200. A user supplied input stage 220 facilitates conducting user supplied processing routines on the unskipped records 215 and provides one or more data records 225. In one embodiment, the data pipeline 200 may be configured to receive data records 225 directly from the user supplied input stage 220 without use of the skip stage 210.

The filtering stage 230 filters the data records 225 such that selected records 235 are passed on to the remainder of the pipeline 200, while other records are discarded. The record filtering accomplished by the filtering stage 230 preferably occurs as directed by control statements associated with record filtering.

The stop stage 240 receives the selected records 235 from the filtering stage 230. The stop stage 240 passes a selected number of the data records 245 to the remainder of the data pipeline 200. In one embodiment, the selected number of data records 245 is indicated by a control block created from one or more control statements associated with a set of data records. After the selected number of records 245 have been supplied to the remainder of the data pipeline 200, the stop stage 240 indicates an end of data condition to the next stage in the data pipeline 200.

The reformatting stage 250 reformats data within the records 245 and passes formatted records 255 to the sort stage 260 which in turn provides sorted records 265. In addition to sort operations, the sort stage 260 may also be configured to merge or copy data records as specified by the control statements associated with the records being processed. The reformatting stage 270 applies additional formatting operations to the sorted records 265 to provide one or more formatted records 275.

The formatted records 275 are fed to the user supplied output stage 280. Upon completion of the customized processing provided by the user supplied output stage 280, one or more data records 285 are passed either to the supplemental processing stage 290, or alternately, directly to an output file 295. The supplemental processing stage 290 is configured to conduct multiple passes on the data records 285 and conduct specialized formatting and reporting operations in order to generate multiple forms of output related to the set of data records.

Figure 3:
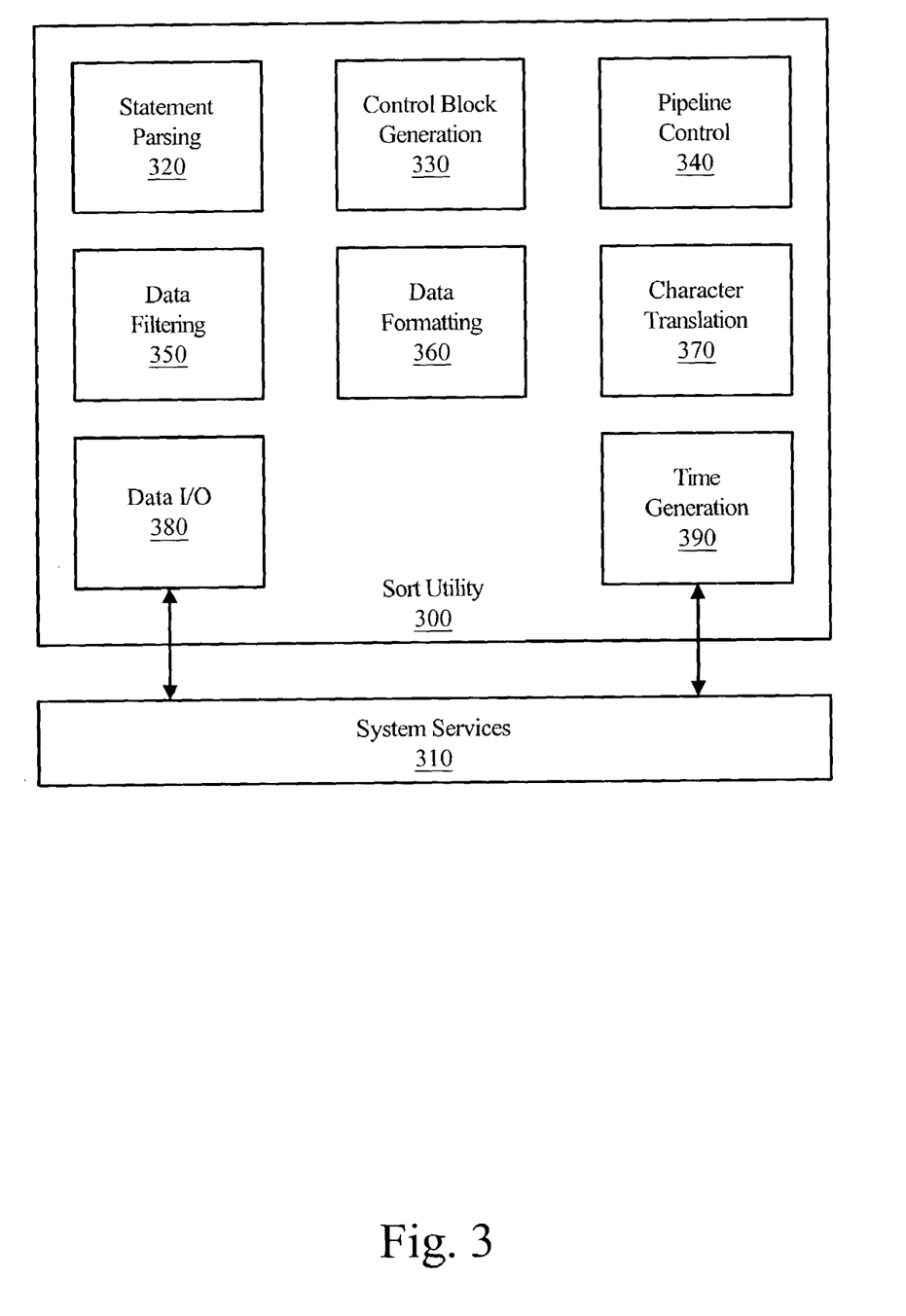
FIG. 3 is a block diagram illustrating one embodiment of a sort utility in accordance with the present invention.

FIG. 3 is a block diagram illustrating selected modules of a sort utility 300 in accordance with the present invention. The sort utility 300 provides record-oriented processing services such as sorting, merging, copying, summing, and formatting of data records. In one embodiment, the sort utility 300 is configured to provide record-oriented processing services to system utilities, operating system extensions, programming languages, applications, and the like.

In the depicted embodiment, the sort utility 300 includes a variety of modules useful for record-oriented processing. The functionality of the modules within the sort utility 300 is increased by the use of system services 310 such as those available within an operating system such as IBM®'s z/OS or OS390. The modules depicted in FIG. 3 include a statement parsing module 320, a control block generation module 330, a pipeline control module 340, a data filtering module 350, a data formatting module 360, a character translation module 370, a data I/O module 380, and a time generation module 390.

The sort utility 300 receives a set of control statements (not shown) that in one embodiment are used to configure the data pipeline 200 depicted in FIG. 2 via one or more control blocks (not shown). The statement parsing module 320 parses the control statements to ascertain various options and parameters related to the processing stages of the data pipeline 200. The control block generation module 330 encodes the parsed options and parameters into the control blocks used to configure the data pipeline 200.

The pipeline control module 340 coordinates execution and the movement of data between the stages of the data pipeline 200. As a data record finishes a pipeline stage it is directed to a subsequent stage. The data filtering module 350 includes or omits data records for subsequent processing based on conditions specified in control statements. The data I/O module(s) 380 provide I/O services to the sort utility 300 such as retrieving records to feed the pipeline and storing records processed by the pipeline.

The data formatting module 360 provides services that facilitate formatting data fields into forms appropriate for processing and/or inclusion into data records. The time generation module 390 is closely related to the data filtering module 350 and the data formatting module 360. The time generation module 390 conducts methods that efficiently generate time constants into a plurality of formats. The character translation module 370 facilitates translating selected characters within fields and records to a desired character set.

The emphasis of the data pipeline 200 and the sorting utility 300 is utility and processing efficiency. The use of control blocks facilitates off-line compilation of control statements into a form efficiently accessed by the data pipeline 200. Much of the processing of the data pipeline 200 relates to data translation and data reformatting. Consequently, data formatting and translation methods are needed that increase the performance, efficiency, and utility of the sort utility 300 and associated data pipeline 200.

Figure 4:
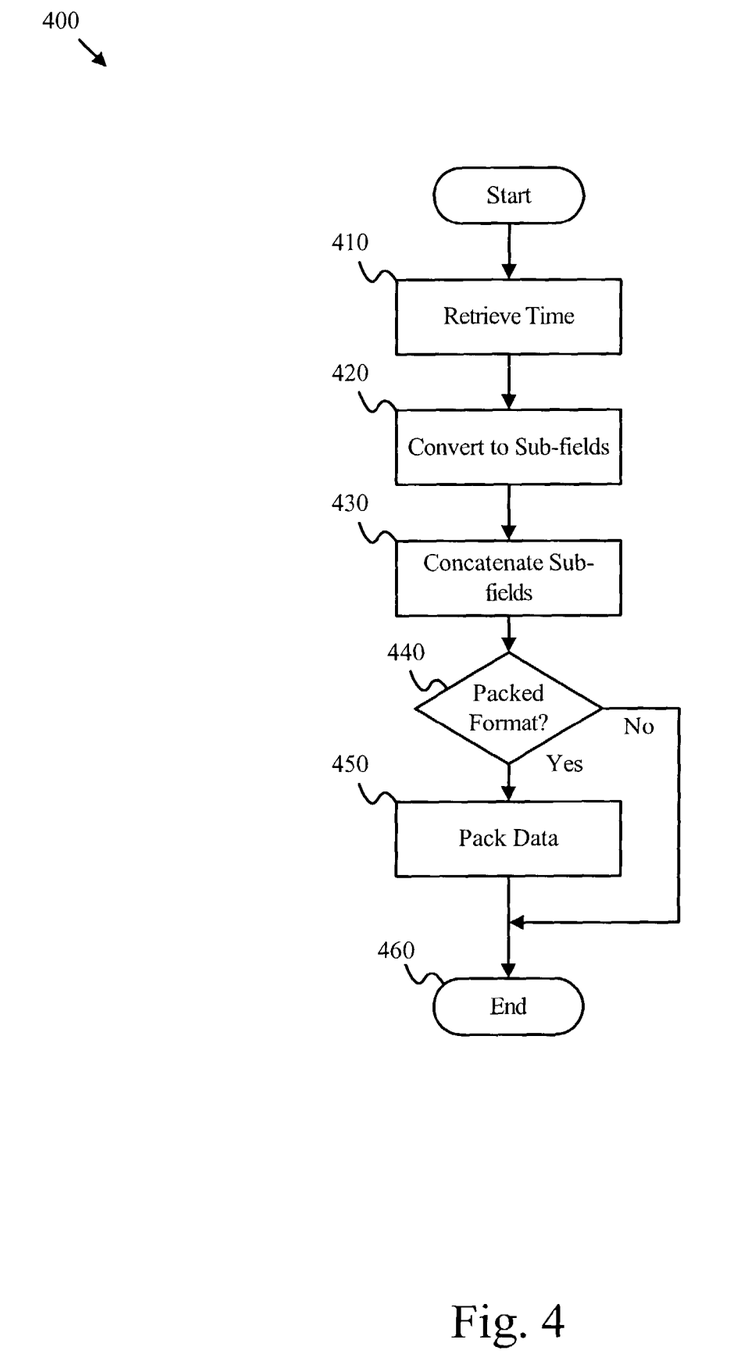
FIG. 4 is a flow chart illustrating one embodiment of a time formatting method of the present invention.

FIG. 4 is a flow chart illustrating one embodiment of a time formatting method 400 of the present invention. The time formatting method 400 may be conducted in conjunction with the time generation module 390, and either the data filtering module 350 or the data formatting module 360. In one embodiment, the results generated by the time formatting method 400 are used by the filtering module 230, the reformatting module 250, the reformatting module 270, and the supplemental statements 290. The time formatting method 400 improves the utility and efficiency of generating date fields particularly within pipelined batch processing systems such as the data pipeline 200.

The time formatting method 400 includes a retrieve time step 410, a convert step 420, a concatenate step 430, a packed format test 440, and a pack data step 450. The retrieve time step 410 retrieves a time metric such as the current time from a time source such as a system timer or system time service. Preferably, the time source is capable of tracking time on a scale ranging from seconds to years. In one embodiment, the time source is a hardware-based counter that is incremented at regular intervals via a highly precise crystal.

The convert step 420 converts the retrieved time metric into a plurality of time sub-fields. In one embodiment, the time sub-fields include the current year, day of the year, month, day of the month, hour, minute, and second. Preferably, the sub-fields comprise human readable characters such as EBCDIC or ASCII characters.

To generate the retrieved time into a specified format, the concatenate step 430 concatenates a selected set of time sub-fields into a single field. In one embodiment, the order of concatenation is determined by the relative coarseness of respective sub-field units. Concatenating sub-field units in order—from most coarse to least coarse—facilitates comparing formatted time fields using standard string compare routines.

In certain embodiments, packed numeric formats such a packed decimal may be generated by conducting the packed format test 440, and the pack data step 450. The packed format test 440 ascertains whether the specified format comprises packed data. If not, the time formatting method 400 ends 460. If the specified format comprises packed data, the method 400 proceeds to the pack data step 450 to conduct any required data packing. Upon completion of the pack data step 450, the time formatting method 400 ends 460.

Figure 5:
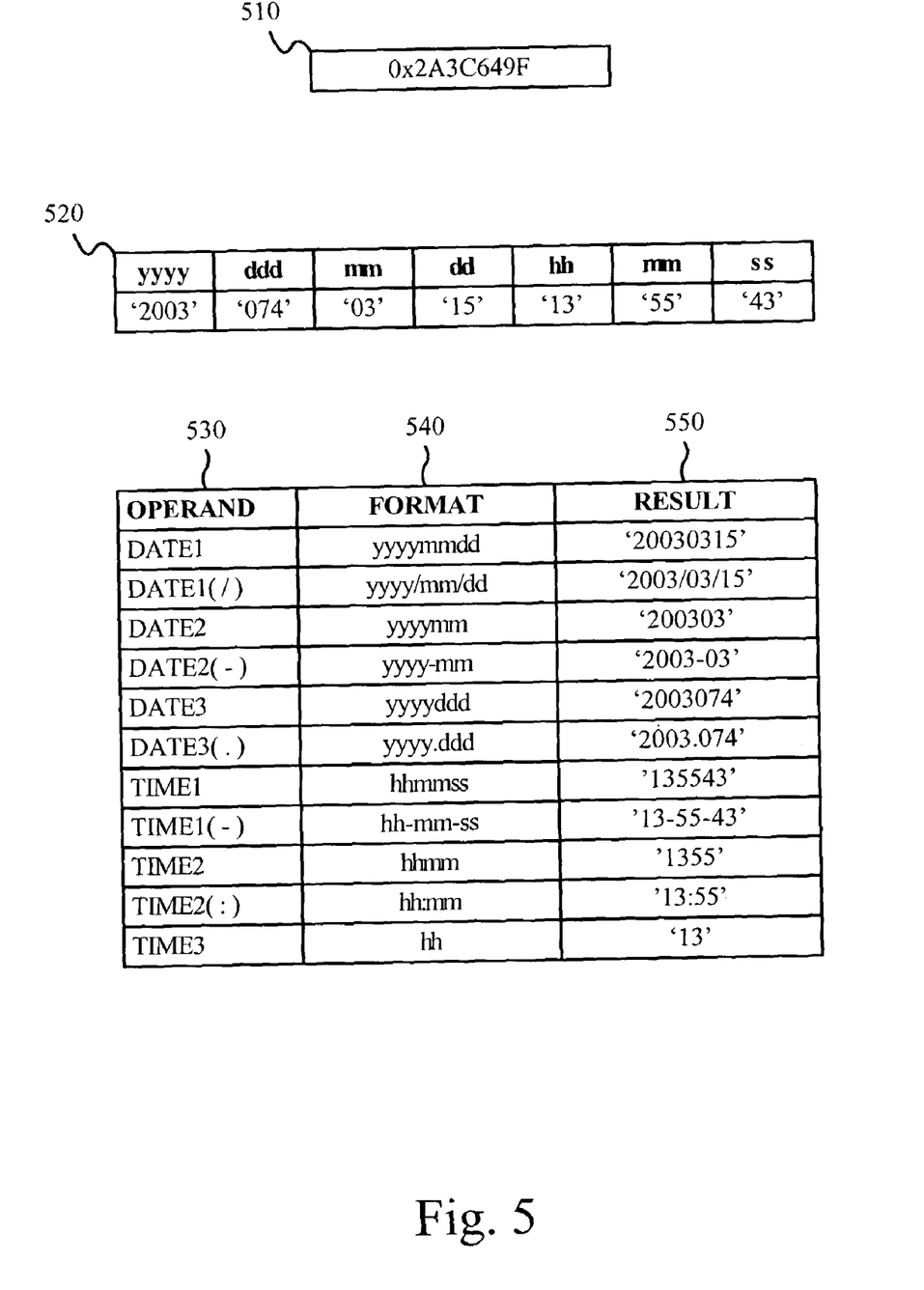
FIG. 5 is a text-based diagram illustrating various representative examples of time data formatted by the method of FIG. 4.

FIG. 5 is a text-based diagram illustrating one example of time data formatted by the time formatting method 400. A time metric 510 is retrieved from a time source such as a system timer or time service. The time metric 510 is converted to a number of time sub-fields 520, which are human readable characters in the depicted example. In response to various operands 530, selected sub-fields 520 are concatenated into the generated time constants 550, each time constant 550 corresponding to a specified format 540.

Figure 6:
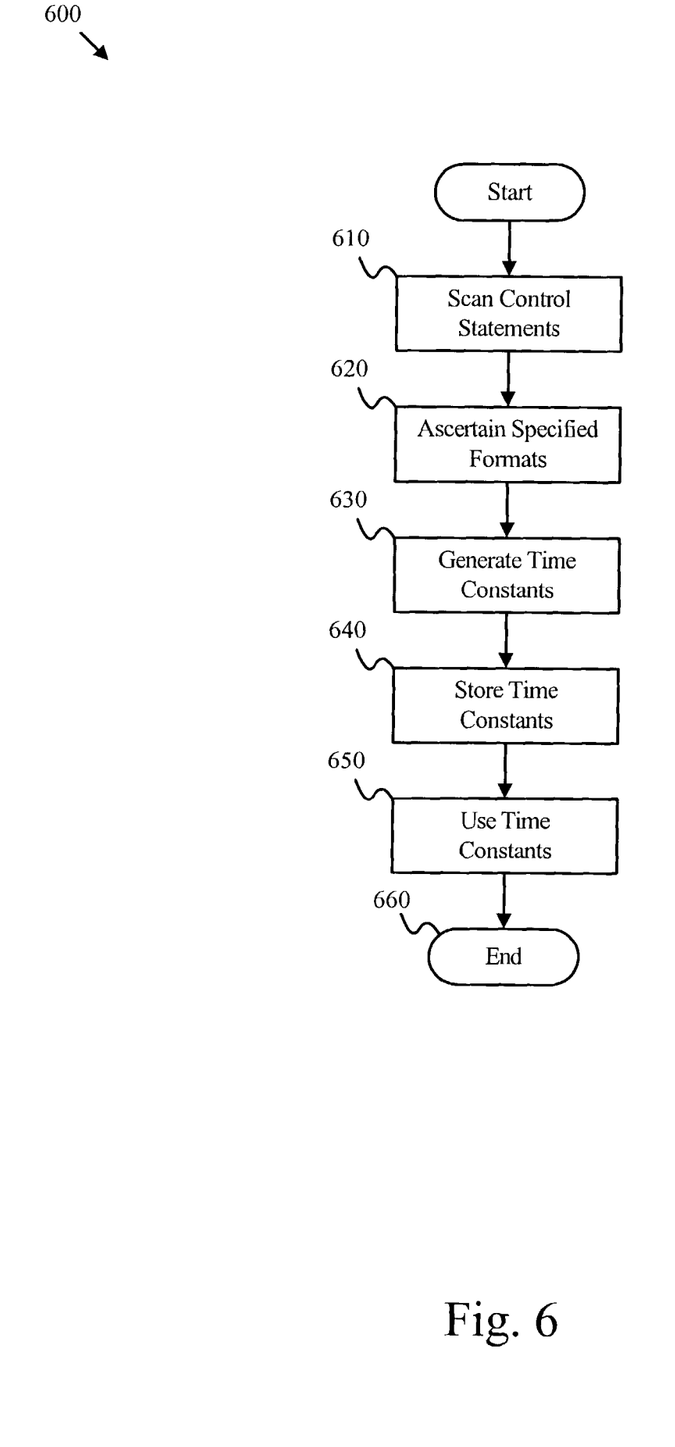
FIG. 6 is a flow chart illustrating one embodiment of a record formatting method of the present invention.

In one embodiment of the present invention, the time formatting method 400 may be conducted for an entire set of data records in an efficient manner. One strategy to conduct the method 400 for an entire set of data records in an efficient manner is shown in FIG. 6 as the depicted record formatting method 600. The record formatting method 600 includes a scan step 610, an ascertain formats step 620, a generate formats step 630, a store constants step 640, and a use constants step 650. The steps of the method 600 will be described in conjunction with the various elements shown in FIG. 5.

The scan step 610 scans the control statements associated with a set of data records (not shown.) The ascertain formats step 620 ascertains the specified formats 540 contained within the scanned control statements. In one embodiment, the ascertain formats step 620 consolidates the specified formats 540 by compiling a list (not shown) of specified formats.

The generate formats step 630 generates a time constant 550 for each specified format 540. In one embodiment, the generate formats step 630 is conducted using the time formatting method 400. The store constants step 640 stores the associated time constants 550 in locations readily accessible for processing such as locations accessible to the data pipeline 200 and sort utility 300. The use constants step 650 uses, or references, the time constants 550 in conjunction with the set of data records. After usage, the record formatting method 600 ends 660.

The record formatting method 600 may be conducted via timing means such as a system timer, a timing circuit or the like; conversion means configured to convert the time metric to a plurality of time sub-fields; concatenation means configured to concatenate selected time sub-fields into generated time constants in each of a plurality of specified time formats; and comparison means configured to conduct a byte-by-byte comparison of the generated time constant with a referenced time constant. In one embodiment, the conversion means, concatenation means, and comparison means are provided by the time generation module 390 by invoking routines from a library of sub-routines.

Figure 7:
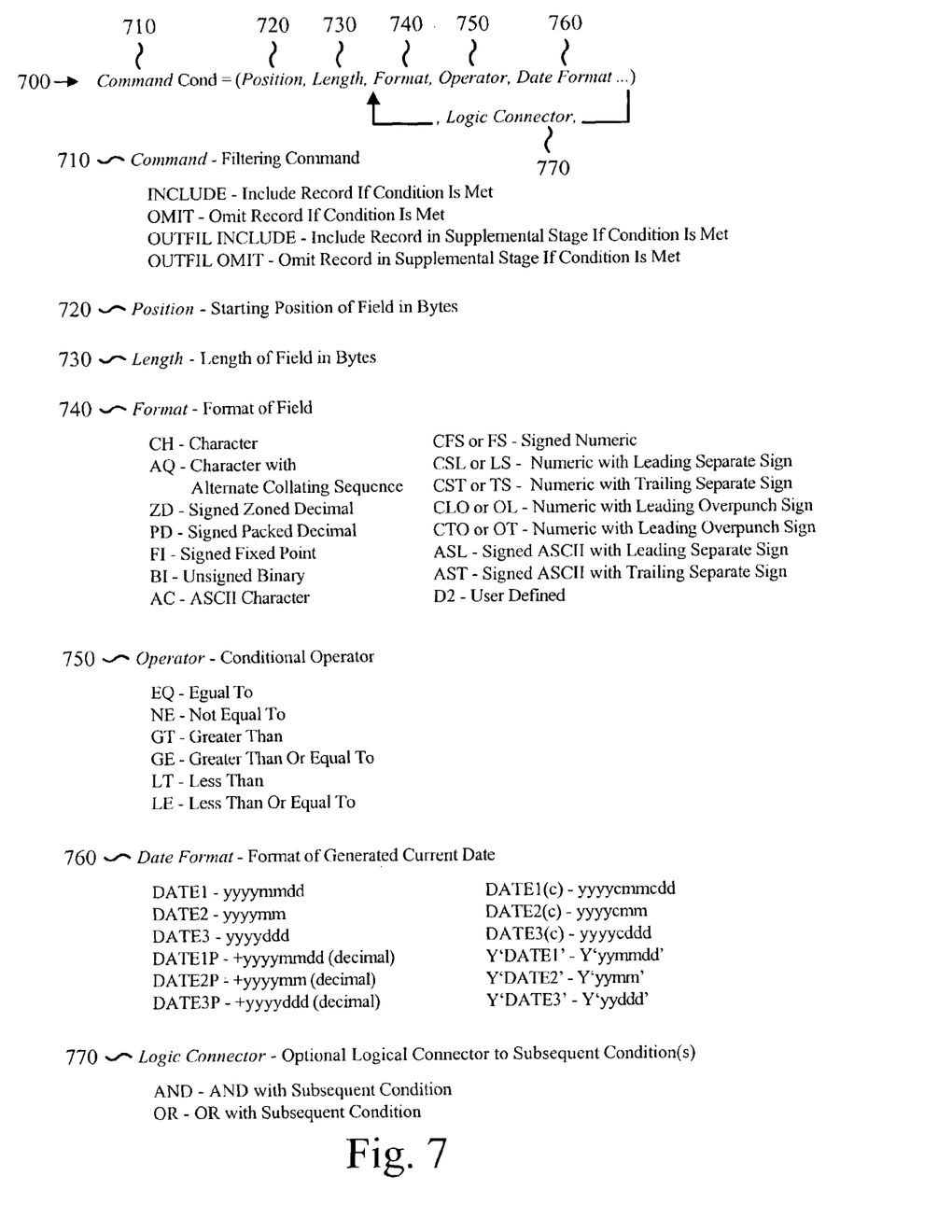
FIG. 7 is a text-based diagram illustrating the syntax of one embodiment of a filtering control statement of the present invention.

FIG. 7 is a text-based diagram illustrating the syntax of one embodiment of a filtering control statement 700 of the present invention. For illustration purposes, the depicted syntax is shown in a simplified form. A more detailed description of the depicted syntax is contained within release 14 of IBM®'s "DFSORT Application Programming Guide" which is incorporated herein by reference.

The filter control statement 700 specifies various options and parameters related to the record filtering module 230, the data filtering module 350, and the supplemental statement modules 290. The depicted filtering control statement 700 includes a command indicator 710, a position indicator 720, a length indicator 730, a format indicator 740, an operator indicator 750, a date format indicator 760, and a logical connector indicator 770.

The command indicator 710 indicates whether the control statement is an 'include' statement or an 'omit' statement. 'Include' statements facilitate including records that meet conditions specified with the filtering control statement 700, while 'omit' statements facilitate excluding records that meet conditions specified with the filtering control statement 700. The depicted command indicator 710 illustrates the syntax for 'INCLUDE' and 'OMIT' commands corresponding to the record filtering module 230, as well as the 'OUTFIL INCLUDE' and 'OUTFIL OMIT' commands corresponding to the supplemental stage 290.

The position indicator 720 indicates the starting position of a field that is tested against the specified condition, while the length indicator 730 indicates the length of the tested field. The format indicator 740 indicates the data format of the field specified by the position indicator 720 and the length indicator 730. The operator indicator 750 indicates the comparison operation conducted in conjunction with the filtering command such as less than, equal to, greater than, less than or equal to, not equal to, and greater than or equal to.

The date format indicator 760 indicates the specified format of the generated time constant that is used in the comparison operation. The ability to specify the date format facilitates conducting a comparison operation using standard string compare routines such as a byte-by-byte memory compare operation available as a machine instruction or a programming language macro. The logical connector indicator 770 facilitates creating complex control statements by combining multiple conditions within a single control statement 700. For example, in one embodiment multiple conditions may be ORed or ANDed together within a control statement.

The various options and parameters that may be specified in the filter control statement 700, such as depicted in FIG. 7, facilitate efficient and effective record filtering within the data pipeline 200.

Figure 8:
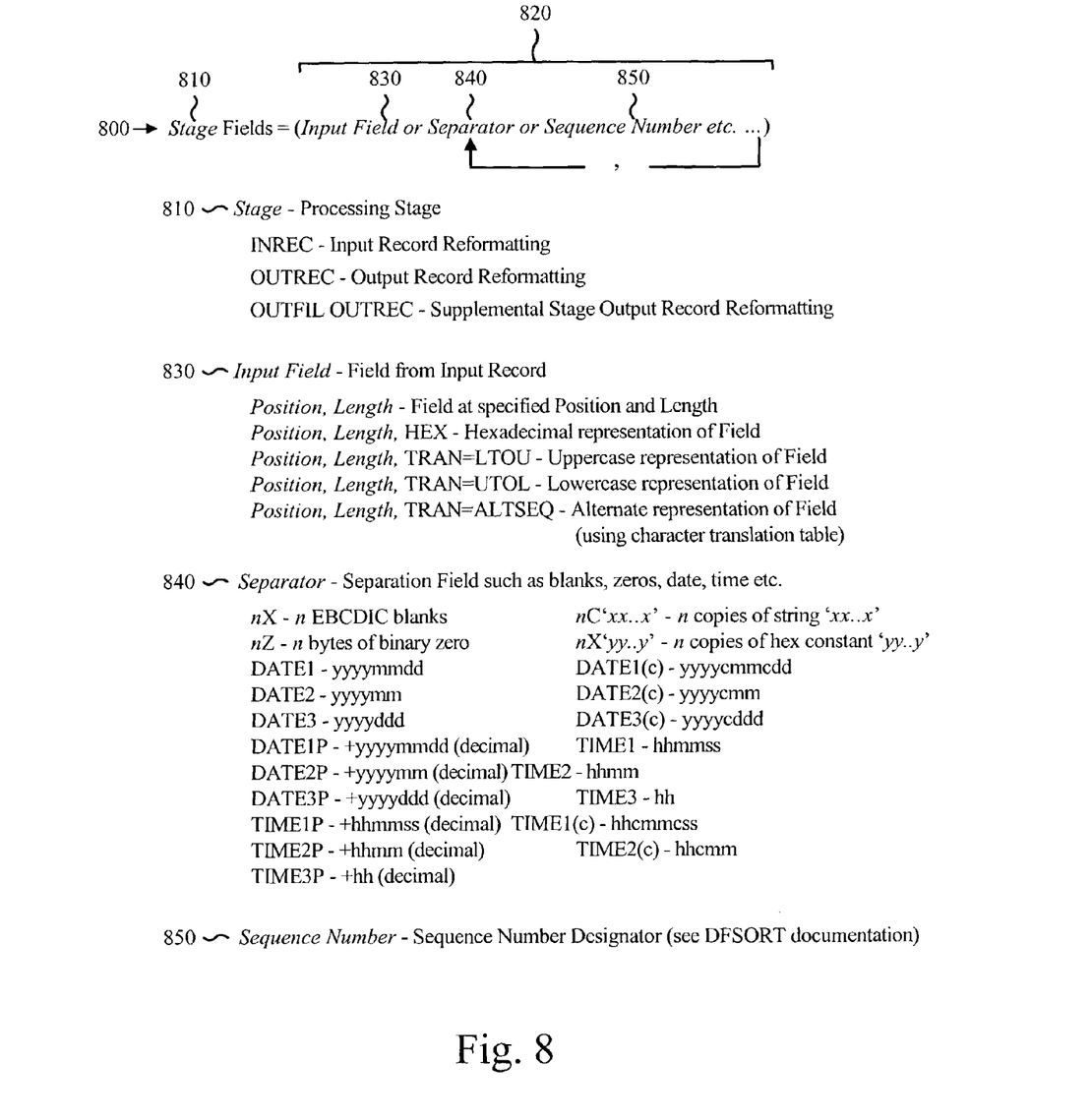
FIG. 8 is a text-based diagram illustrating the syntax of one embodiment of a record reformatting control statement of the present invention.

FIG. 8 is a text-based diagram illustrating the syntax of one embodiment of a reformatting control statement 800 of the present invention. As with the control statement 700, the depicted syntax is shown in a simplified form while a more detailed description of the depicted syntax is contained within IBM®'s "DFSORT Application Programming Guide".

As depicted, the reformatting control statement 800 facilitates specifying options and parameters related to the (input) reformatting module 250, the (output) reformatting module 270, the supplemental statement modules 290, and the data formatting module 360.

The depicted reformatting control statement 800 includes a stage indicator 810 and a formatted record specification 820. The formatted record specification 820 may include one or more of the following: an input field indicator 830, a separator indicator 840, and a sequence number indicator 850. Multiple indicators 830, 840, and 850 may be included within a single statement 800 to reformat records to a desired set of fields within the formatted record.

The reformatting control statement 800 facilitates selecting fields for concatenation into a reformatted record. The selected fields are concatenated in order of appearance within the selected fields specification 820. The stage indicator 810 indicates which pipeline stage or module the control statement applies to such as an input stage (INREC), an output stage (OUTREC), or a supplemental stage (OUTFIL OUTREC).

The input field indicator 830 is used to specify a field to be concatenated into the formatted record. The separator indicator 840 is used to specify a separator to be included within the formatted record. As depicted, the separator indicator 840 may be used to include, blanks, zeros, string constants, and date/time constants. The sequence number indicator 850 facilitates including sequence numbers with formatted records. The various indicators depicted in FIG. 8 facilitate applying reformatting operations to data records.

The present invention increases the utility and performance of record-oriented processing by utilizing time constants generated in a plurality of formats to conduct filtering and reformatting operations. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a time constant in a plurality of specified time formats, the method comprising:
    scanning control statements for a data pipeline to ascertain a plurality of specified time formats and compile a list of the specified time formats contained within the scanned control statements, the specified time formats comprising yyyymmdd, yyyy/mm/dd, yyyymm, yyyy-mm, yyyyddd, yyyy.ddd, a decimal date, a decimal year and month, HHMMSS, HHMM, and HH, wherein yyyy is a year, mm is a month, dd is a day of a month, ddd is a day of a year, HH is an hour, MM is minutes, and SS is seconds and wherein the control statements are record input control statements, record filtering control statements, record formatting control statements, and record output control statements, and the data pipeline processes records as directed by the control statements;
    converting a time metric to a plurality of time sub-fields corresponding to all elements of the plurality of specified time formats of the compiled list, wherein the time sub-fields comprise Extended Binary Coded Decimal Interchange Code (EBCDIC) characters for a year, a day of a year, a month, a day of the month, an hour, minutes, and seconds;
    concatenating selected time sub-fields to provide a generated time constant in the plurality of specified time formats;
    storing the generated time constants in readily accessible locations; and
    comparing time constants within data records with the generated time constant.

2. The method of claim 1, further comprising including the generated time constant within a data record.

3. The method of claim 1, further comprising filtering data records based on comparisons of the generated time constant with referenced time constants within data records.

4. The method of claim 1, further comprising selectively inputting a data record based on comparisons of the generated time constant with referenced time constants within data records.

5. The method of claim 1, further comprising selectively outputting a data record based on comparisons of the generated time constant with referenced time constants within data records.

6. The method of claim 1, wherein retrieving a time metric comprises invoking a system time service.

7. A method for generating time constants in a plurality of specified time formats, the method comprising:
    scanning a plurality of control statements for a data pipeline wherein the control statements are record input control statements, record filtering control statements, record formatting control statements, and record output control statements and the data pipeline processes records as directed by the control statements;
    ascertaining a plurality of time formats of the plurality of specified time formats referenced in the plurality of control statements and compiling a list of the specified time formats comprising yyyymmdd, yyyy/mm/dd, yyyymm, yyyy-mm, yyyyddd, yyyy.ddd, a decimal date, a decimal year and month, HHMMSS, HHMM, and HH, wherein yyyy is a year, mm is a month, dd is a day of a month, ddd is a day of a year, HH is an hour, MM is minutes, and SS is seconds;
    converting a time metric to a plurality of time sub-fields corresponding to all elements of the plurality of time formats of the compiled list, wherein the time sub-fields comprise EBCDIC characters for a year, a day of a year, a month, a day of a month, an hour, minutes, and seconds;
    generating a plurality of time constants for each of the plurality of time formats from the sub-fields by concatenating selected time sub-fields to provide the generated time constants; and
    storing the time constants in readily accessible locations.

8. A system for processing data records, the system comprising:
    a mainframe computer configured to execute control statements for a data pipeline, wherein the control statements comprise record input control statements, record filtering control statements, record formatting control statements, and record output control statements and the data pipeline processes records as directed by the control statements;

a sort utility configured to input, sort, and output a plurality of data records;

a parser configured to scan the control statements, ascertain a plurality of time formats referenced in the control statements, and compile a list of the plurality of time formats, the plurality of time formats comprising yyyymmdd, yyyy/mm/dd, yyyymm, yyyy-mm, yyyy-ddd, yyyy.ddd, a decimal date, a decimal year and month, HHMMSS, HHMM, and HH, wherein yyyy is a year, mm is a month, dd is a day of a month, ddd is a day of a year, HH is an hour, MM is minutes, and SS is seconds;

a time generation module configured to provide generated time constants in the plurality of time formats by retrieving a time metric, converting the time metric to a plurality of time sub-fields corresponding to all elements of the plurality of time formats of the compiled list, wherein the time sub-fields comprise EBCDIC characters for a year, a day of a year, a month, a day of a month, an hour, minutes, and seconds, concatenating selected time sub-fields to provide the generated time constants, and storing the generated time constants in readily accessible locations; and the sort utility further configured to compare time constants within data records with the generated time constants.

9. The system of claim 8, wherein the sort utility is further configured to selectively filter the plurality of data records.

10. The system of claim 8, wherein the sort utility is further configured to merge the plurality of data records.

11. An apparatus for comparing referenced time constants within data records with generated time constants formatted in a plurality of time formats, the apparatus comprising:

parsing means configured to scan control statements associated with a set of data records for a data pipeline, ascertain time formats referenced in the control statements, and compile a list of the time formats, wherein the control statements are record input control statements, record filtering control statements, record formatting control statements, and record output control statements and the plurality of time formats comprise yyyymmdd, yyyy/mm/dd, yyyymm, yyyy-mm, yyyy-ddd, yyyy.ddd, a decimal date, a decimal year and month, HHMMSS, HHMM, and HH, wherein yyyy is a year, mm is a month, dd is a day of a month, ddd is a day of a year, HH is an hour, MM is minutes, and SS is seconds, and the data pipeline processes records as directed by the control statements;

conversion means configured to convert a time metric to a plurality of time sub-fields corresponding to all elements of the plurality of time formats, wherein the time sub-fields comprise EBCDIC characters for a year, a day of a year, a month, a day of a month, an hour, minutes, and seconds;

concatenation means configured to concatenate selected time sub-fields to provide a generated time constant in each of the plurality of time formats of the compiled list, and store the generated time constant in a readily accessible location; and comparison means configured to conduct a byte-by-byte comparison of the generated time constant with a time constant within data records.

12. A system for processing data records, the system comprising:

means for executing control statements;

means for parsing the control statements for a data pipeline to ascertain a plurality of time formats referenced in the control statements and compile a list of the time formats, wherein the control statements are record input control statements, record filtering control statements, record formatting control statements, and record output control statements and the time formats comprise yyyymmdd, yyyy/mm/dd, yyyymm, yyyy-mm, yyyyddd, yyyy.ddd, a decimal date, a decimal year and month, HHMMSS, HHMM, and HH, wherein yyyy is a year, mm is a month, dd is a day of the month, ddd is a day of the year, HH is an hour, MM is minutes, and SS is seconds and the data pipeline processes records as directed by the control statements;

means for generating a plurality of time constants in each of the plurality of time formats by converting a time metric to a plurality of time sub-fields corresponding to all elements of the plurality of specified time formats of the compiled list, wherein the time sub-fields comprise EBCDIC characters for a year, a day of a year, a month, a day of a month, an hour, minutes, and seconds, concatenating selected time sub-fields to provide the plurality of generated time constants in the plurality of specified time formats, and storing the generated time constants in readily accessible locations;

means for comparing time constants within data records with the generated time constants.

13. The system of claim 12, further comprising means for inputting, sorting, and outputting a plurality of data records.

14. A computer readable storage medium comprising computer readable program code for generating time constants in specified formats selected from a plurality of time formats, the program code configured to:

scan control statements associated with a set of data records for a data pipeline, wherein the control statements are record input control statements, record filtering control statements and the data pipeline processes records as directed by the control statements;

ascertain a plurality of time formats referenced in the control statements, compiling a list of the time formats, wherein the plurality of time formats comprise yyyymmdd, yyyy/mm/dd, yyyymm, yyyy-mm, yyyyddd, yyyy.ddd, a decimal date, a decimal year and month, HHMMSS, HHMM, and HH, wherein yyyy is a year, mm is a month, dd is a day of the month, and ddd is a day of the year, HH is an hour, MM is minutes, and SS is seconds;

retrieve a time metric;

convert the time metric to a plurality of time sub-fields corresponding to all elements of the plurality of time formats of the compiled list, wherein the time sub-fields comprise EBCDIC characters for a year, a day of a year, a month, a day of a month, an hour, minutes, and seconds;

concatenate selected time sub-fields to provide generated time constants in each of the plurality of time formats; and store the time constants in readily accessible locations.

15. The method of claim 14, wherein the method further comprises comparing referenced time constants within data records with the generated time constant.

* * * * *